United States Patent
Donnelly (10) Patent No.: US 6,676,173 B2
(45) Date of Patent: Jan. 13, 2004

(54) DUCT JOINER AND METHOD OF MANUFACTURE

(75) Inventor: William James Donnelly, Ivanhoe (AU)

(73) Assignee: Talana Investments Limited, Tortola (VG)

( * ) Notice: Subject to any disclaimer, the term of this patent is extended or adjusted under 35 U.S.C. 154(b) by 14 days.

(21) Appl. No.: 09/994,215

(22) Filed: Nov. 26, 2001

(65) Prior Publication Data

US 2003/0098586 A1 May 29, 2003

(51) Int. Cl.$^7$ .............................. F16L 17/00; F16L 19/00
(52) U.S. Cl. ........................ 285/373; 285/419; 285/373
(58) Field of Search ...................... 285/23, 419, 120.1, 285/122.1, 125.1, 131.1, 132.1, 133.11, 133.4, 133.6, 285.1, 286.1, 286.2, 294.1, 295.3, 345, 347, 373, 417

(56) References Cited

U.S. PATENT DOCUMENTS

| | | | | |
|---|---|---|---|---|
| 3,924,661 A | * | 12/1975 | Bornhoffer | 138/110 |
| 3,955,834 A | * | 5/1976 | Ahlrot | 285/110 |
| 4,216,981 A | * | 8/1980 | Jensen | 285/97 |
| 4,374,596 A | * | 2/1983 | Schlemmer et al. | 285/305 |
| 4,728,129 A | * | 3/1988 | Morris | 285/334 |
| 5,370,426 A | * | 12/1994 | Meyers | 285/237 |
| 5,687,993 A | * | 11/1997 | Brim | 285/120.1 |
| 5,921,592 A | * | 7/1999 | Donnelly | 285/340 |
| 5,944,359 A | * | 8/1999 | Andronaco | 285/55 |
| 6,158,784 A | * | 12/2000 | Lavender | 285/239 |

* cited by examiner

*Primary Examiner*—David Bochna
*Assistant Examiner*—Aaron Dunwoody
(74) *Attorney, Agent, or Firm*—Greer, Burns & Crain, Ltd.

(57) ABSTRACT

A duct joiner for air ducting is provided which has at least one tubular neck portion with resilient projections extending out of a first annular groove, a sealing ring mounted in a second annular groove and further resilient projections extending out of a third annular groove. A ramp surface between the first and second grooves assists in fitting an end portion of an air duct over the neck portion which rides over the resilient projections, then moves along the ramp surface and over the sealing ring and then over the resilient projections extending from the third groove. The projections then engage with the internal surface of the duct to retain the duct on the neck portion and a good sealing contact is achieved about the sealing ring. There is also provided a method of manufacturing such a duct joiner by moulding the joiner in at least two parts and joining side edges of the two parts together by complementary interengaging formations.

36 Claims, 5 Drawing Sheets

DUCT JOINER AND METHOD OF MANUFACTURE

FIELD OF THE PRESENT INVENTION

This invention relates generally to ducting which is used in ducted heating systems and air conditioning systems, and particularly relates to an improved duct joiner for joining an end portion of a hollow air duct either to another air duct or to another part of a heating or air conditioning system, such as an air diffuser or a grille outlet. The invention also relates to a method of manufacturing such a duct joiner.

BACKGROUND OF THE INVENTION

It is known to use duct joiners to join together ducts in a ducted heating or air conditioning system by placing a duct over a neck portion of the duct joiner and taping the duct to the duct joiner. This form of connection can easily break, is time consuming when installing ducts, and does not provide an effective sealed connection. This last deficiency results in an inefficient air conditioning system since a substantial amount of the conditioned air does not reach the space that requires the air conditioning but is lost through the connections of the duct and duct joiners.

It is therefore desirable to provide an improved means for connecting a duct to a duct joiner in which one or more of the disadvantages of known connecting means are overcome. It is also desirable to provide a duct joiner which is relatively inexpensive and easy to manufacture and use.

The duct joiner of the present invention is particularly, but not exclusively, applicable for use in joining flexible ducting having a generally cylindrical cross-section, the ducting being produced by encapsulating a helically formed wire support in a flexible polymeric substrate material.

SUMMARY OF THE INVENTION

According to one aspect of the invention, there is provided a duct joiner for air ducting, the joiner having at least one tubular neck portion formed of resilient plastics material having a first open end, a second end and a through channel allowing the passage of air from one of the ends to the other, the tubular neck portion having a plurality of annular grooves formed therein, a first groove of the annular grooves being disposed closest to the first open end and provided with a plurality of resilient projections extending out of the first groove and adapted to engage with the internal surface of an end portion of a hollow air duct fitted on the joiner, a second groove of the annular grooves being adapted to receive a sealing ring of relatively soft material which extends out of the second groove for sealing engagement with the internal surface of the end portion of the duct, wherein the outer surface of the tubular neck portion between the first and second grooves is a ramp surface being of lesser diameter adjacent the fist groove and of greater diameter adjacent the second groove, the ramp surface assisting in assembly of the end portion of the hollow air duct on the duct joiner.

In use of the duct joiner, the tubular neck portion is inserted into the end portion of a hollow air duct which is of slightly greater diameter than the diameter of the tubular neck portion. The internal surface of the duct engages first with the resilient projections which flex to allow the duct to pass over the projections. The duct end then engages with the ramp surface which slightly expands the internal diameter of the end portion of the duct to assist in further movement of the duct over the resilient projections and the sealing ring received in the second groove.

In a preferred form of the invention, the second groove for the sealing ring is disposed between the first groove and a third annular groove which is also provided with a plurality of resilient projections which extend out of the further groove to provide further means for engaging the internal surface of the end portion of the duct. Preferably, the outer surface of the tubular neck portion between the second groove and the further groove is also a ramp surface, the ramp surface being of lesser diameter adjacent the further groove and of greater diameter adjacent the second groove. The design of the ramp surfaces is such that a firm sealing contact is achieved between the internal wall of the duct and the sealing ring.

The preferred arrangement of the sealing ring in the second groove between the resilient projections extending out of the first groove and the further groove provides a very effective sealed connection which is easy to assemble and relatively easy to disassemble. Further, the duct joiner of the present invention does not require separate fastening clips or fastening tape to secure the duct joiner to the end of an air duct.

Preferably, the duct joiner has an annular flange provided at the end of the tubular portion remote from the first open end which can be used as an abutment or stop for the end of an air duct fitted on the tubular neck portion of the joiner.

The duct joiner may have a single neck portion and an air outlet portion providing an exit channel through which air can blow into a room or the like. Alternatively, a duct joiner in accordance with the invention may have a plurality of neck portions, each having the grooves provided with resilient projections and a sealing ring for joining one duct to at least one other duct. For instance, a duct joiner may be provided for joining ducts of different diameters, the joiner having a first generally cylindrical neck portion of one diameter and a second generally cylindrical neck portion of another diameter, each neck portion having the grooves with resilient projections and a sealing ring. Also, a duct joiner having at least one branching neck portion in addition to a main neck portion or neck portions may be provided for connecting a branch duct to a main duct.

In a preferred method of manufacture, the duct joiner in accordance with the first aspect of the invention is formed by moulding the duct joiner in at least two parts with complementary interengaging formations provided on side edges of the parts, and the side edges of the parts are joined together by the complementary interengaging formations.

According to another aspect of the invention there is provided a method of forming a duct joiner having at least one tubular neck portion with annular grooves for resilient projections and for a sealing ring, said method including the steps of:

forming the duct joiner in at least two parts with complementary interengaging formations provided on side edges of the parts; and joining the side edges of the at least two parts together by means of the complementary interengaging formations.

Preferably, the interengaging formations provided on the side edges of the joiner parts comprise a recess or mortice in one of the parts and a complementary projection or tenon on the side edge of the other part.

In a particularly preferred embodiment of this aspect of the invention, there is provided a branch duct joiner formed in two parts joined together in the manner above and having first and second tubular neck portions sharing a common longitudinal axis and provided on each side of a central section, the central section having a cylindrical sideways extension adapted to be joined to a tubular branching neck portion.

BRIEF DESCRIPTION OF THE DRAWINGS

These and other aspects of the present invention will now be described in more detail, by way of example only, with reference to the accompanying drawings in which.

DESCRIPTION OF THE PREFERRED EMBODIMENTS

Referring to FIGS. 1 to 7, there is shown a duct joiner 1 having first and second tubular neck portions 2 and 3 on each side of a central annular flange 4. Each neck portion is of generally cylindrical form having an open end 5 remote from the flange 4 with first, second and third annular grooves 6, 7 and 8 provided in each generally cylindrical neck portion 2, 3.

Figure 2:
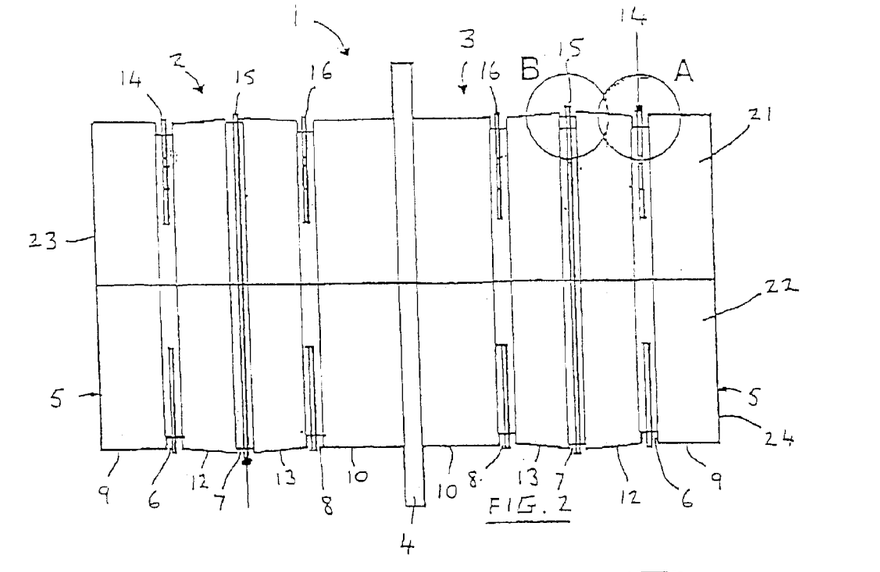
FIG. 2 is side view of the duct joiner of FIG. 1.
Figure 4A:
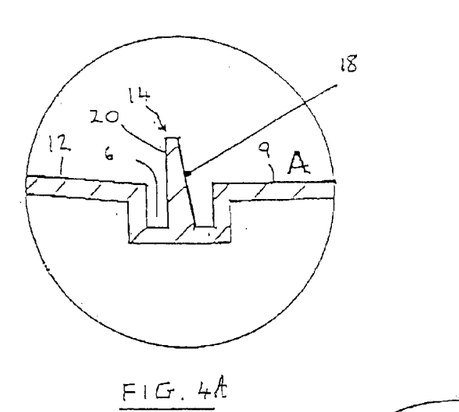
FIGS. 4a and 4b are enlarged sections through the joiner wall of alternative embodiments taken at A in FIG. 2.
Figure 4B:
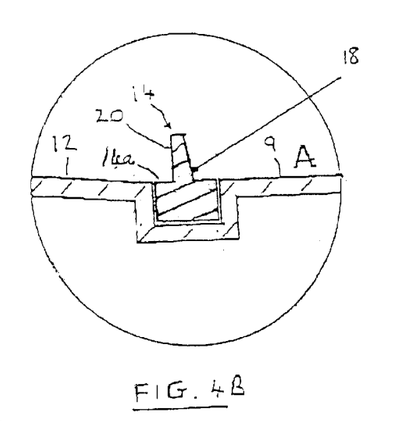
Figure 5:
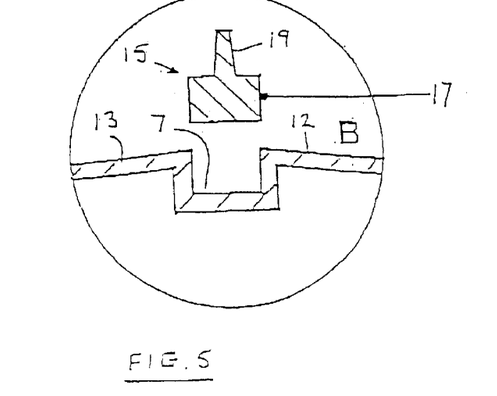
FIG. 5 is an enlarged section through the joiner wall taken at B in FIG. 2.
Figure 6:
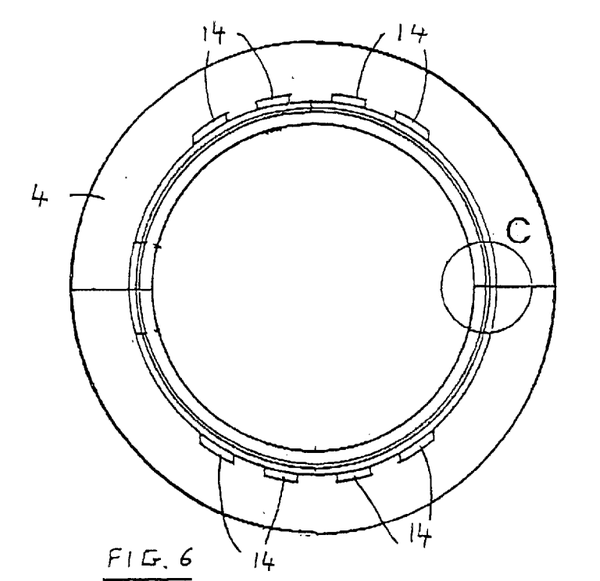
FIG. 6 is an end elevation of the joiner of FIG. 1.

Referring more particularly to FIGS. 2, 4 and 5, each tubular neck portion 2, 3 has a cylindrical outer surface 9 at its open end 5, a cylindrical outer surface 10 at its other end adjacent the flange 4, a first ramp surface 12 between the first groove 6 and the second groove 7, and a second ramp surface 13 between the second groove 7 and the third groove 8. The purpose of the ramp surfaces 12 and 13 will be apparent from the subsequent description of the duct joiner in use.

Each of the first and third grooves 6, 8 is provided with a series of resilient projections 14, 16 respectively which extend out of the first and third grooves 6, 8. A sealing ring 15 of soft material 15 is mounted in the second groove 7 of each of the neck portions 2, 3. Each sealing ring is of annular form having a base part 17 which is substantially rectangular in cross-section and a radially outwardly extending flexible portion 19 as shown in FIG. 5. The sealing ring may be formed from an elastomeric material, such as rubber or a rubberized polymeric material. In use, the sealing ring 15 is fitted onto the neck portion 2, 3 of the duct joiner 1 by being stretched over outer surfaces 9 and 12 and the resilient projections 14 and located in the groove 7. If required, the sealing ring 15 may be heated to expand the annular ring to facilitate fitting. Upon cooling, the sealing ring 15 is retained in the groove 7.

The resilient projections 14, 16 in the grooves 6, 8 are preferably in the form of teeth and may be formed integrally with the generally cylindrical wall of the neck portions, as shown in FIG. 4A. Alternatively, the projections may be formed separately from the neck portions as shown in FIG. 4B, the projections having mounting pails 14a which are received in the grooves and teeth extending from the grooves. The projections 14 are preferably of tapered form, each having a surface 18 facing towards the open end 5 of the neck portion which is inclined away from the open end 5 and a straight surface 20 facing towards the flange 4.

Figures 1, 3:
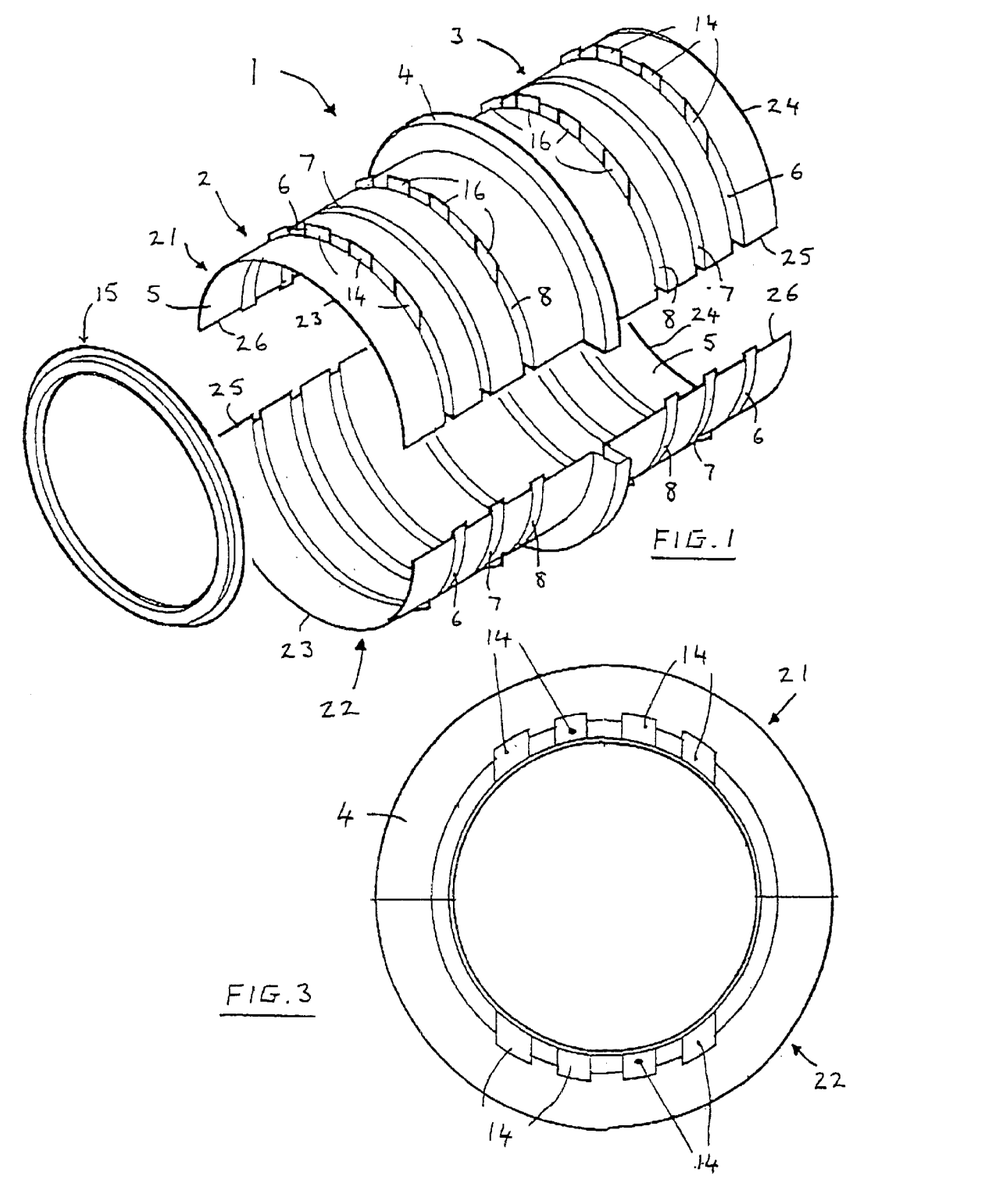
FIG. 1 is an exploded perspective view of a duct joiner in accordance with the invention.
FIG. 3 is a section through the joiner taken at A in FIG. 2.

As shown in FIG. 1, the duct joiner is formed in two generally semi-cylindrical halves 21, 22 each having semi-circular end edges 23, 24 and longitudinally extending side edges 25, 26. Each of the parts 21, 22 of the duct joiner is preferably formed of a resilient plastics material, preferably by injection moulding.

In the embodiment shown in FIGS. 1 to 7, four resilient projections 14 in the shape of teeth are provided for each groove 6, 8 in each of the two halves 21, 22 of the duct joiner 1. It will, however, be appreciated that the number location and shape of the projections may vary.

Figure 7:
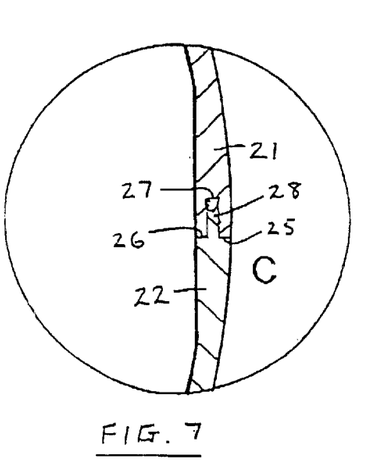
FIG. 7 is an enlarged section taken at C in FIG. 6.

The two halves 21, 22 of the duct joiner are preferably joined together in the manner illustrated in FIG. 7 in which the longitudinally extending side edge 25 of one of the semi-cylindrical halves 21 has a rectangular recess or mortice 27 for receiving a complementary projection or tenon 28 provided on the longitudinally extending side edge 26 of the other semi-cylindrical half 22.

If required, an adhesive may be placed within the recess 27 to provide a more positive connection of the semi-cylindrical halves of the duct joiner.

In use, an end portion of a hollow cylindrical air duct, generally flexible ducting formed by encapsulating a helically formed wire support in a polymeric substrate material, can be fitted on one of the neck portions 2, 3 of the duct joiner in the following manner. The end portion of a duct having an internal diameter slightly larger than the external diameter of the cylindrical outer surface 9 of the joiner is moved over that surface 9 until the end of the duct contacts the surface 18 of the resilient teeth 14. Further movement of the duct end towards the flange 4 causes the teeth 14 to flex to allow the end portion of the duct to ride over the teeth. The duct end then comes into contact with the ramp surface 12 which facilitates further movement of the duct end over the sealing ring 15 and towards the flange 4. More particularly, with ducting which includes a helical wire support in a polymeric substrate, the ramp surface 12 stretches the polymeric wall of the duct covering the helical wire support. The end of the duct is then moved over the ramp surface 13 which has a smaller external diameter adjacent the third groove 8, and a larger external diameter adjacent the second groove 7, and then over the resilient teeth 16 in the third groove 8 until the end of the duct abuts against the annular flange 4. In this assembled position, movement of the duct away from the flange is resisted by the resilient teeth 14, 16 and the sealing ring 15 provides an effective seal between the resilient teeth 14, 16 which retain the duct on the neck portion of the duct joiner. The ramp surfaces 12 and 13 are specifically designed to ensure that a firm contact is achieved about the sealing ring 15.

Figure 8:
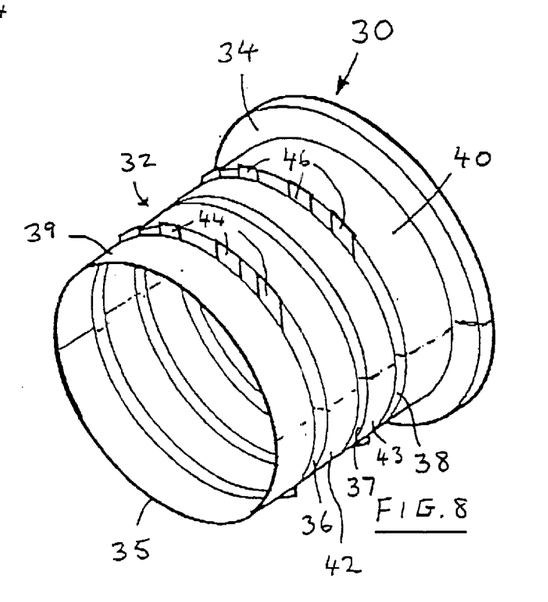
FIG. 8 is a perspective view of another duct joiner in accordance with the invention.

FIG. 8 shows a modified duct joiner 30 in accordance with the invention which has a single generally cylindrical neck portion 32 with an annular flange 34 at its end remote from the open end 35. The neck portion 32 has a first annular groove 36 adjacent the open end 35, a second centrally located annular groove 37 and a third annular groove 38 adjacent the flange 34. A series of resilient projections in the form of teeth 44, 46 extend out of the first and third grooves 36 and 38 respectively, and the second, centrally located groove 37 is adapted to receive a sealing ring in similar manner to the grooves 7 of the duct joiner of FIGS. 1 to 7. The neck portion 32 of the duct joiner 30 is thus of similar form to each of the neck portions 2, 3 of the duct joiner 1 of FIGS. 1 to 7. Also, the neck portion 32 has cylindrical outer surfaces 39, 40 adjacent the open end 35 and the flange 34 respectively and ramp surfaces 42, 43 on each side of the centrally located annular groove 37 which are similar to the ramp surfaces 12, 13 of the duct joiner 1 of FIGS. 1 to 7.

The duct joiner 30 of FIG. 8 may also be formed in two semi-cylindrical halves joined together by mortice and tenon joints in the manner described with reference to FIG. 7. In use, the end of a duct may be joined to the neck portion 32 in the same manner described with reference to the duct joiner 1 of FIGS. 1 to 7, and in this case, the annular flange 34 may be attached to an air outlet, such as a diffuser or grille or another part of a ducted heating or air conditioning system.

It will be appreciated that a duct joiner in accordance with the present invention may take a variety of different forms having different numbers of neck portions. Various other forms of duct joiners are illustrated in FIGS. 9 to 17.

Figures 9, 10, 12:
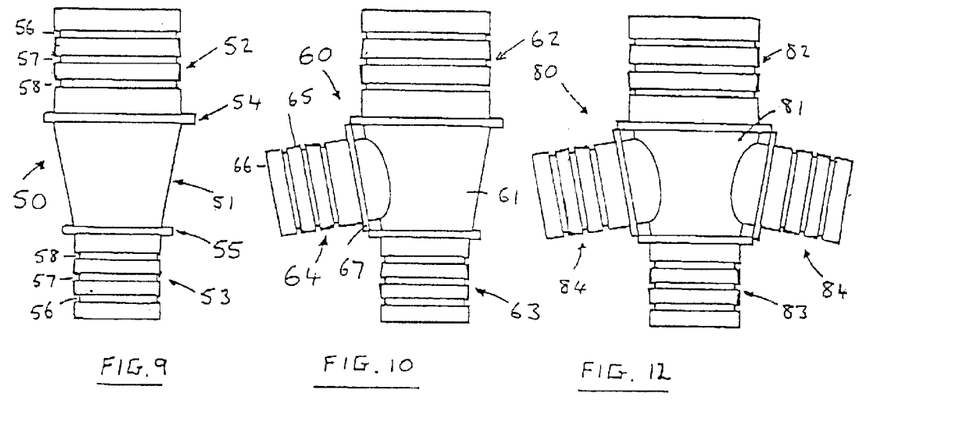
FIGS. 9 to 17 are various elevation and perspective views of other duct joiners in accordance with the invention.

FIG. 9 shows a duct joiner 50 of the type known as a reducer having first and second neck portions 52, 53 of different diameters on opposite sides of a central tapered section 51. The reducer 50 also has annular flanges 54, 55 between the central tapered section 51 and the neck portions 52 and 53 respectively. Each of the neck portions 52 and 53 is of similar form to the neck portions 2 and 3 of the duct joiner 1 of FIGS. 1 to 7 having free annular grooves 56, 57 and 58 with resilient projections and sealing rings (not shown) provided for the grooves. The duct joiner or reducer 50 may be used to join two hollow air ducts of different diameters together by the same joining method as described with reference to FIGS. 1 to 7.

Figure 11:
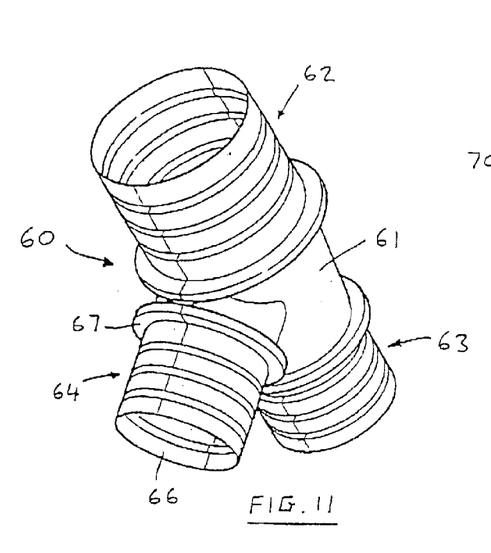
Figure 13:
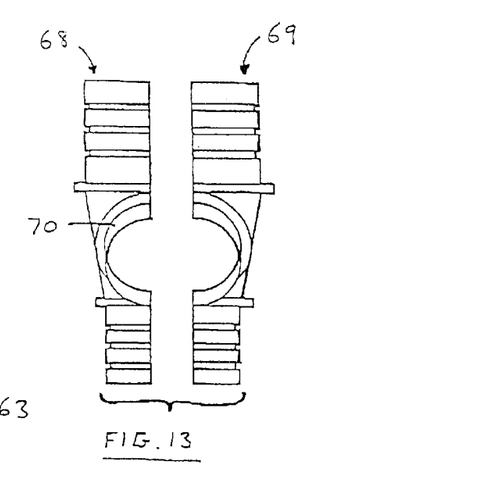

Referring to FIGS. 10 and 11, there is shown a branch duct joiner 60 which is similar to the reducer 50 of FIG. 9 in that it has a central tapered section 61, a neck portion of larger diameter 62 and a neck portion of smaller diameter 63 which share a common longitudinal axis. The branch joiner 60 differs from the joiner 50 in that it has a further joiner part 64 which is of similar form to the modified joiner 30 of FIG. 8 having a neck portion 65 with an open end 66 and a flange 67 at its other end. Each of the neck portions 62, 63 and 64 of the branch joiner 60 are of similar form to the neck portions 2, 3 of the duct joiner 1 of FIGS. 1 to 7. The branch joiner 60 of FIG. 10 may be manufactured by moulding two halves 68 and 69 as shown in FIG. 13 and joining the halves together to form the main part of the branch joiner 60 with a short cylindrical portions 70 extending laterally from the central tapered section 61. The branch portion 64 can then be mounted on the cylindrical extension 70.

Referring to FIG. 12, there is shown a double branch joiner 80 which is similar to the branch joiner 60 in that it has a central tapered section 81 and neck portions 82 and 83 of larger and smaller diameter having a common central longitudinal axis. The double branch joiner 80 differs from the single branch joiner 60 in that it has two branching neck portions 84 extending outwardly from the central tapered section 81 at diametrically opposed positions. The double branch joiner may be formed from two main halves similar to the part 68 and 69 of FIG. 13 with cylindrical portions at diametrically opposed locations on the central tapered section 81 similar to the cylindrical part 70 of FIG. 13, with duct joiner portions similar to that of FIG. 8 mounted on the cylindrical portions 70.

Figure 14:
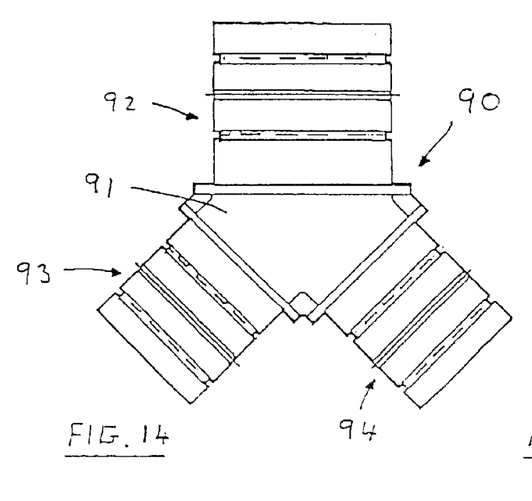
Figure 15:
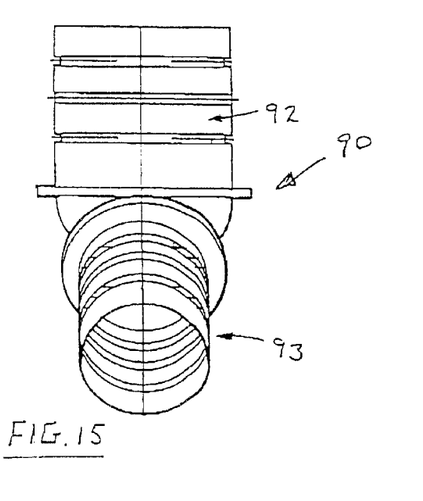
Figure 16:
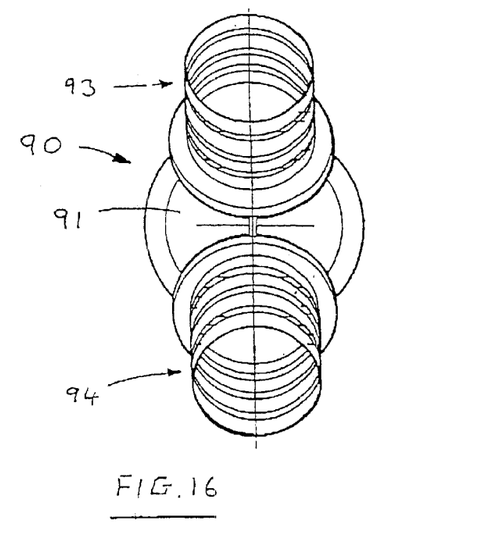

A further modified form of branch joiner 90 is shown in FIGS. 14 to 16. The branch joiner 90 has three neck portions 92, 93 and 94 extending outwardly from a central section 91. The tubular neck portions 92, 93 and 94 extend outwardly from a central point at approximately 120° angles with respect to each other.

Figure 17:
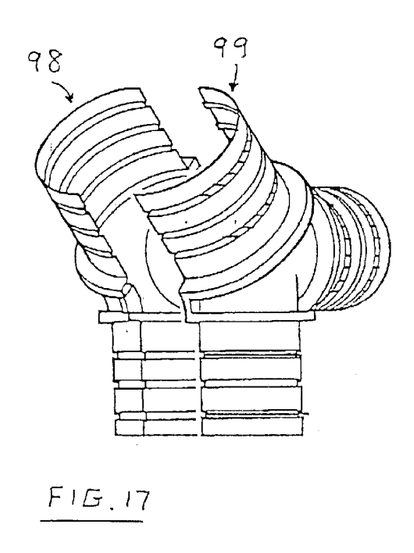

The branch joiner 90 may also be formed in two parts 98, 99 as illustrated in FIG. 17. Once again, these parts may be formed from moulded plastics material, and it will be appreciated that the two halves 98, 99 of the branch joiner 90 are of identical shape and so only one mould is required to form the branch joiner 90.

It should be appreciated from the description above that the present invention provides an improved duct joiner for connecting a duct to either one or more other ducts or to other components of a ducted heating or air conditioning system that is simple and reliable to use whilst providing an effective seal between the joiner and an air duct. Also, it should be appreciated that the duct joiners may be manufactured economically and relatively easily by the method described herein.

It is also to be appreciated that various modifications and alterations may be made to the duct joiner described above without departing from the scope and spirit of the present invention.

What is claimed is:

1. A duct joiner for air ducting, the joiner having at least one tubular neck portion formed of resilient plastics material having a first open end, a second end and a through channel allowing the passage of air from one of the ends to the other, the tubular neck portion having a plurality of annular grooves formed therein, a first groove of the annular grooves being disposed closest to the first open end and provided with a plurality of resilient projections extending out of the first groove and adapted to engage with the internal surface of an end portion of a hollow air duct fitted on the joiner, a second groove of the annular grooves being adapted to receive a sealing ring of relatively soft material which extends out of the second groove for sealing engagement with the internal surface of the end portion of the duct, wherein the outer surface of the tubular neck portion between the first and second grooves is a ramp surface being of lesser diameter adjacent the first groove and of greater diameter adjacent the second groove, the ramp surface being engageable with the internal surface of the end portion of the duct to assist in assembly of the end portion of the hollow air duct on the duct joiner.

2. A duct joiner according to claim 1 wherein the second groove for the sealing ring is disposed between the first groove and a third annular groove.

3. A duct joiner according to claim 2 wherein the third annular groove is provided with a plurality of resilient projections which extend out of a third groove.

4. A duct jointer according to claim 2 wherein the outer surface of the tubular neck portion between the second groove and the third groove is a ramp surface which is of lesser diameter adjacent the third groove and of greater diameter adjacent the second groove.

5. A duct jointer according to claim 1 wherein the duct joiner has an annular flange provided at the end of the tubular neck portion remote from the first open end which can be used as an abutment or stop for the end of an air duct fitted on the tubular neck portion of the joiner.

6. A duct joiner according to claim 1 wherein the resilient projections are in the form of teeth formed integrally with the neck portions.

7. A duct joiner according to claim 1 wherein the projections are formed separately from the neck portions, the projections having parts which are received in the groove or grooves and teeth extending from the groove or grooves.

8. A duct joiner according to claim 1 wherein projections are tapered in cross-section, each projection having a surface facing towards the open end of the neck portion which surface is inclined away from said open end.

9. A duct joiner according to claim 1 wherein the sealing ring has a base part adapted to be received in the second annular groove and an outwardly extending flexible portion extending out of said groove.

10. A duct joiner according to claim 1 wherein the sealing ring is formed from an expandable elastomeric material.

11. A duct joiner according to claim 1 wherein the duct joiner is formed by moulding the duct joiner in at least two parts with complementary interengaging formations provided on side edges of the parts, and the side edges of the parts are joined together by the complementary interengaging formations.

12. A duct joiner according to claim 11 wherein the interengaging formations provided on the side edges of the joiner parts comprise a recess or mortice in one of the parts and a complementary projection or tenon on the side edge of the other part.

13. A duct joiner according to claim 1 wherein the duct joiner has a single neck portion and an air outlet portion providing an exit channel for air.

14. A duct joiner according to claim 1 wherein the joiner has a plurality of neck portions, each having grooves provided with resilient projections and a sealing ring for joining one duct to at least one other duct.

15. A duct joiner according to claim 14 wherein the joiner has a first generally cylindrical neck portion of one diameter and a second generally cylindrical neck portion of another diameter, each neck portion having grooves with resilient projections and a sealing ring.

16. A duct joiner according to claim 14 wherein the duct joiner has a main neck portion and at least one branching neck portion for connecting a branch duct to a main duct.

17. A duct joiner according to claim 14 wherein the joiner has first and second tubular neck portions sharing a common longitudinal axis and provided on each side of a central section, the central section having a cylindrical sideways extension adapted to be joined to a tubular branching neck portion.

18. A method of forming a duct joiner for joining ducts in a ducted heating or air conditioning system having at least one tubular neck portion, said method including the steps of:
    forming the duct joiner in at least two parts with complementary interengaging formations provided on side edges of the parts, each of said parts of the duct joiner being provided with a plurality of grooves, at least one of the grooves having resilient projections provided therein;
    joining the side edges of the at least two parts together by means of the complementary interengaging formations, whereby the grooves in the parts of the joiner form annular grooves when the at least two parts of the duct joiner are joined together, and
    fitting a sealing ring in another of said grooves, said sealing ring circumscribing said tubular neck portion.

19. A method according to claim 18 wherein the interengaging formations provided on the side edges of the joiner parts comprise a recess in one of the parts and a complementary projection on the other of the parts.

20. A method according to claim 19 wherein the recess is formed as a mortice and the projection is formed as a tenon.

21. A method according to claim 19 wherein an adhesive is placed in the recess to assist in securing the joiner parts together.

22. A method according to claim 18 wherein the step of forming the duct joiner comprises the step of moulding two semi-cylindrical joiner parts.

23. A method according to claim 18 wherein the step of forming the duct joiner comprises the steps of forming: a first groove having resilient projections extending radially out of the first groove; a second groove for receiving the sealing ring; and a ramp surface which extends between the first and second grooves; wherein the first groove is closer to a first open end of the neck portion and a diameter of the ramp surface adjacent the first groove is less than that adjacent the second groove.

24. A method according to claim 23 wherein the step of forming the duct joiner further comprises the step of forming a third groove having resilient projections extending radially out of the third groove so that the second grove is disposed between the first and third grooves.

25. A method according to claim 23 including the further step of fitting an elastomeric sealing ring in said second groove.

26. A method according to claim 25 wherein the sealing ring is expanded and moved over the resilient projections in the first groove and then located in the second groove.

27. A method according to claim 26 wherein the sealing ring is expanded by heating.

28. A method according to claim 18 wherein the joiner parts are formed with a flange at the end of the tubular neck portion remote from the first open end.

29. A method according to claim 18 wherein the joiner parts are moulded separately and joined together so as to form a joiner having a plurality of neck portions.

30. A duct joiner for air ducting, the joiner having at least one tubular neck portion formed of resilient plastic material having a first open end, a second end and a through channel allowing the passage of air from one of the ends to the other, the tubular neck portion having a plurality of annular grooves formed therein, a first groove of the annular grooves being disposed closest to the first open end and provided with a plurality of resilient projections extending out of the first groove and adapted to engage with the internal surface of an end portion of a hollow air duct fitted on the joiner, a second groove of the annular grooves being adapted to receive a sealing ring of relatively soft material which extends out of the second groove for sealing sealing engagement with the internal surface of the end portion of the duct, and a third groove of the annular grooves being provided with a plurality of resilient projections which extend out of the third groove and being positioned so that the second groove is disposed between the first and third annular grooves, wherein the outer surface of the tubular neck portion between the first and second grooves is a ramp surface being of lesser diameter adjacent the first groove and of greater diameter adjacent the second groove, the ramp surface being engageable with the internal surface of the end portion of the duct to assist in assembly of the end portion of the hollow air duct on the duct joiner.

31. A duct joiner for air ducting formed of resilient plastic material, the joiner having first and second tubular neck portions sharing a common longitudinal axis and provided on each side of a central section, the central section having a cylindrical sideways extension adapted to be joined to a tubular branching neck portion, the duct joiner having through channels allowing the passage of air therethrough, between joined ducts, the first and second tubular neck portions each having a plurality of annular grooves formed therein, a first groove of the annular grooves being disposed closest to the first open end and provided with a plurality of resilient projections extending out of the first groove and adapted to engage with the internal surface of an end portion, of a hollow air duct fitted on the joiner, a second groove of the annular grooves being adapted to receive a sealing ring of relatively soft material which extends out of the second groove for sealing engagement with the internal surface of the end portion of the duct, wherein the outer surface of the tubular neck portion between the first and second grooves is a ramp surface being of lesser diameter adjacent the first groove and of greater diameter adjacent the second groove, the ramp surface being engageable with the internal surface of the end portion of the duct to assist in assembly of the end portion of the hollow air duct on the duct joiner.

32. A method of forming a duct joiner for joining ducts in a ducted hearting or air conditioning system having at least one tubular neck portion, said method including the steps of:

forming the duct jointer in at least two parts with complementary interengaging formations provided on side edges of the parts, each of said parts of the duct joiner being provided with first and second grooves and a ramp surface which extends therebetween, the first groove being closer to a first open end of the neck portion and a diameter of the ramp surface adjacent the first groove being less than that adjacent the second groove, the first groove having resilient projections extending radially out of the first groove and the second groove arranged to receive a sealing ring;

joining the side edges of the at least two parts together by means of the complementary interengaging formations, whereby the grooves in the parts of the joiner form annular groove when the at least two parts of the duct joiner are joined together; and fitting a sealing ring in the second groove.

33. A method according to claim 32 wherein the step of forming the duct joiner further comprises the step of forming a third groove having resilient projections extending radially out of the third groove so that the second groove is disposed between the first and third grooves.

34. A method according to claim 32 including the further step of fitting an elastomeric sealing ring in said second groove.

35. A method according to claim 34 wherein the sealing ring is expanded and moved over the resilient projections in the first groove and then located in the second groove.

36. A method according to claim 35, wherein the sealing ring is expanded by heating.

* * * * *